United States Patent
Hughes et al.

(10) Patent No.: US 8,109,776 B2
(45) Date of Patent: Feb. 7, 2012

(54) TWO-MATERIAL SEPARABLE INSULATED CONNECTOR

(75) Inventors: David Charles Hughes, Rubicon, WI (US); Thomas Augustia, New Berlin, WI (US); John Mitchell Makal, Menomonee Falls, WI (US); Michael John Gebhard, Sr., Waukesha, WI (US)

(73) Assignee: Cooper Technologies Company, Houston, TX (US)

( * ) Notice: Subject to any disclaimer, the term of this patent is extended or adjusted under 35 U.S.C. 154(b) by 62 days.

(21) Appl. No.: 12/072,647

(22) Filed: Feb. 27, 2008

(65) Prior Publication Data

US 2009/0215299 A1    Aug. 27, 2009

(51) Int. Cl.
*H01R 13/52*    (2006.01)
(52) U.S. Cl. ........................................ 439/282; 439/921
(58) Field of Classification Search .................. 439/181, 439/445, 921, 89, 281, 282; 174/84 R, DIG. 8
See application file for complete search history.

(56) References Cited

U.S. PATENT DOCUMENTS

| | | | |
|---|---|---|---|
| 1,903,956 A | 4/1933 | Christie et al. | |
| 2,953,724 A | 9/1960 | Hilfiker et al. | |
| 3,115,329 A | 12/1963 | Wing et al. | |
| 3,315,132 A | 4/1967 | Raymond | |
| 3,392,363 A | 7/1968 | Geis, Jr. et al. | |
| 3,471,669 A | 10/1969 | Curtis | |
| 3,474,386 A | 10/1969 | Link | |
| 3,509,516 A | 4/1970 | Phillips | |
| 3,509,518 A | 4/1970 | Phillips | |
| 3,513,425 A | 5/1970 | Arndt | |
| 3,539,972 A | 11/1970 | Silva et al. | |
| 3,542,986 A | 11/1970 | Kotski | |
| 3,546,535 A | 12/1970 | Van Riemsdijk | |
| 3,576,493 A | 4/1971 | Tachick et al. | |
| 3,594,685 A | 7/1971 | Cunningham | |
| 3,652,975 A | 3/1972 | Keto | |
| 3,654,590 A | 4/1972 | Brown | |

(Continued)

FOREIGN PATENT DOCUMENTS

DE            3110609          10/1982

(Continued)

OTHER PUBLICATIONS

U.S. Appl. No. 11/809,508, Hughes et. al.

(Continued)

*Primary Examiner* — Thanh Tam Le
(74) *Attorney, Agent, or Firm* — King & Spalding, LLP

(57) ABSTRACT

Stiff and soft materials each provide certain advantages when used in the manufacture of separable insulated connectors, such as elbow and T-body connectors. Utilizing a shell or an insert that includes one section made from a stiff material and one section made from a soft material can provide a separable insulated connector that capitalizes on the advantages associated with both types of materials. The stiff materials and soft materials can be placed strategically on the shell or insert of the separable insulated connector to maximize the advantages of each material. For example, the stiff material can be used to form a section of the separable insulated connector where strength and durability is most desirable, and conversely, the soft material can be used to form a section of the connector where flexibility is desirable.

23 Claims, 3 Drawing Sheets

U.S. PATENT DOCUMENTS

| | | | |
|---|---|---|---|
| 3,663,928 A | 5/1972 | Keto | |
| 3,670,287 A | 6/1972 | Keto | |
| 3,678,432 A * | 7/1972 | Boliver | 337/201 |
| 3,711,818 A * | 1/1973 | Swehla | 439/89 |
| 3,720,904 A | 3/1973 | De Sio | |
| 3,725,846 A * | 4/1973 | Strain | 439/89 |
| 3,740,503 A | 6/1973 | Tomohiro et al. | |
| 3,740,511 A | 6/1973 | Westmoreland | |
| 3,798,586 A | 3/1974 | Huska | |
| 3,826,860 A | 7/1974 | De Sio et al. | |
| 3,845,233 A | 10/1974 | Burton | |
| 3,860,322 A | 1/1975 | Sankey et al. | |
| 3,915,534 A | 10/1975 | Yonkers | |
| 3,924,914 A | 12/1975 | Banner | |
| 3,945,699 A | 3/1976 | Westrom | |
| 3,949,343 A | 4/1976 | Yonkers | |
| 3,953,099 A | 4/1976 | Wilson | |
| 3,955,874 A | 5/1976 | Boliver | |
| 3,957,332 A | 5/1976 | Lambert, III | |
| 3,960,433 A | 6/1976 | Boliver | |
| 4,029,380 A | 6/1977 | Yonkers | |
| 4,040,696 A | 8/1977 | Wada et al. | |
| 4,067,636 A | 1/1978 | Boliver et al. | |
| 4,088,383 A | 5/1978 | Fischer et al. | |
| 4,102,608 A | 7/1978 | Balkau et al. | |
| 4,103,123 A | 7/1978 | Marquardt | |
| 4,107,486 A | 8/1978 | Evnas | |
| 4,113,339 A | 9/1978 | Eley | |
| 4,123,131 A | 10/1978 | Pearce, Jr. et al. | |
| 4,152,643 A | 5/1979 | Schweitzer | |
| 4,154,993 A | 5/1979 | Kumbera et al. | |
| 4,161,012 A | 7/1979 | Cunningham | |
| 4,163,118 A | 7/1979 | Marien et al. | |
| 4,186,985 A | 2/1980 | Stepniak et al. | |
| 4,203,017 A | 5/1980 | Lee | |
| 4,210,381 A | 7/1980 | Borgstrom | |
| 4,223,179 A | 9/1980 | Lusk et al. | |
| 4,260,214 A | 4/1981 | Dorn | |
| 4,343,356 A | 8/1982 | Riggs et al. | |
| 4,353,611 A | 10/1982 | Siebens et al. | |
| 4,354,721 A | 10/1982 | Luzzi | |
| 4,360,967 A | 11/1982 | Luzzi et al. | |
| 4,443,054 A | 4/1984 | Ezawa et al. | |
| 4,463,227 A | 7/1984 | Dizon et al. | |
| 4,484,169 A | 11/1984 | Nishikawa | |
| 4,500,935 A | 2/1985 | Tsuruta et al. | |
| 4,508,413 A | 4/1985 | Bailey | |
| 4,568,804 A | 2/1986 | Luehring | |
| 4,600,260 A | 7/1986 | Stepniak et al. | |
| 4,626,755 A | 12/1986 | Butcher et al. | |
| 4,638,403 A | 1/1987 | Amano et al. | |
| 4,678,253 A | 7/1987 | Hicks et al. | |
| 4,688,013 A | 8/1987 | Nishikawa | |
| 4,700,258 A | 10/1987 | Farmer | |
| 4,714,438 A * | 12/1987 | Williams | 439/607.51 |
| 4,715,104 A | 12/1987 | Schoenwetter et al. | |
| 4,722,694 A | 2/1988 | Makal et al. | |
| 4,767,894 A | 8/1988 | Schombourg | |
| 4,767,941 A | 8/1988 | Brand et al. | |
| 4,779,341 A | 10/1988 | Roscizewski | |
| 4,793,637 A | 12/1988 | Laipply et al. | |
| 4,799,895 A | 1/1989 | Borgstrom | |
| 4,820,183 A | 4/1989 | Knapp et al. | |
| 4,822,291 A | 4/1989 | Cunningham | |
| 4,822,951 A | 4/1989 | Wilson et al. | |
| 4,834,677 A | 5/1989 | Archang | |
| 4,857,021 A | 8/1989 | Boliver et al. | |
| 4,863,392 A | 9/1989 | Borgstrom et al. | |
| 4,867,687 A | 9/1989 | Williams et al. | |
| 4,871,888 A | 10/1989 | Bestel | |
| 4,875,581 A * | 10/1989 | Ray et al. | 206/720 |
| 4,891,016 A | 1/1990 | Luzzi et al. | |
| 4,911,655 A | 3/1990 | Pinyan et al. | |
| 4,946,393 A | 8/1990 | Borgstrom et al. | |
| 4,955,823 A | 9/1990 | Luzzi | |
| 4,972,049 A | 11/1990 | Muench | |
| 4,982,059 A | 1/1991 | Bestel | |
| 5,025,121 A | 6/1991 | Allen et al. | |
| 5,045,656 A | 9/1991 | Kojima | |
| 5,045,968 A | 9/1991 | Suzuyama et al. | |
| 5,053,584 A | 10/1991 | Chojnowski | |
| 5,101,080 A | 3/1992 | Ferenc | |
| 5,114,357 A * | 5/1992 | Luzzi | 439/183 |
| 5,128,824 A | 7/1992 | Yaworski et al. | |
| 5,130,495 A | 7/1992 | Thompson | |
| 5,166,861 A | 11/1992 | Krom | |
| 5,175,403 A | 12/1992 | Hamm et al. | |
| 5,213,517 A | 5/1993 | Kerek et al. | |
| 5,215,475 A * | 6/1993 | Stevens | 439/206 |
| 5,221,220 A | 6/1993 | Roscizewski | |
| 5,230,142 A | 7/1993 | Roscizewski | |
| 5,230,640 A | 7/1993 | Tardif | |
| 5,248,263 A | 9/1993 | Sakurai et al. | |
| 5,266,041 A | 11/1993 | De Luca | |
| 5,277,605 A | 1/1994 | Roscizewski et al. | |
| 5,356,304 A | 10/1994 | Colleran | |
| 5,358,420 A | 10/1994 | Cairns et al. | |
| 5,359,163 A | 10/1994 | Woodard | |
| 5,393,240 A | 2/1995 | Makal et al. | |
| 5,422,440 A | 6/1995 | Palma | |
| 5,427,538 A | 6/1995 | Knapp et al. | |
| 5,429,519 A | 7/1995 | Murakami et al. | |
| 5,433,622 A | 7/1995 | Galambos | |
| 5,435,747 A | 7/1995 | Franckx et al. | |
| 5,445,533 A | 8/1995 | Roscizewski et al. | |
| 5,468,164 A | 11/1995 | Demissy | |
| 5,492,487 A | 2/1996 | Cairns et al. | |
| 5,525,069 A | 6/1996 | Roscizewski et al. | |
| 5,589,671 A | 12/1996 | Hackbarth et al. | |
| 5,619,021 A | 4/1997 | Yamamoto et al. | |
| 5,641,310 A | 6/1997 | Tiberio, Jr. | |
| 5,655,921 A | 8/1997 | Makal | |
| 5,661,280 A | 8/1997 | Kuss et al. | |
| 5,667,060 A | 9/1997 | Luzzi | |
| 5,717,185 A | 2/1998 | Smith | |
| 5,736,705 A | 4/1998 | Bestel et al. | |
| 5,737,874 A | 4/1998 | Sipos et al. | |
| 5,747,765 A | 5/1998 | Bestel et al. | |
| 5,747,766 A | 5/1998 | Waino et al. | |
| 5,757,260 A | 5/1998 | Smith et al. | |
| 5,766,030 A | 6/1998 | Suzuki | |
| 5,766,517 A | 6/1998 | Goedde et al. | |
| 5,795,180 A | 8/1998 | Siebens | |
| 5,808,258 A | 9/1998 | Luzzi | |
| 5,816,835 A | 10/1998 | Meszaros | |
| 5,846,093 A | 12/1998 | Muench et al. | |
| 5,857,862 A | 1/1999 | Muench et al. | |
| 5,864,942 A | 2/1999 | Luzzi | |
| 5,912,604 A | 6/1999 | Harvey et al. | |
| 5,917,167 A | 6/1999 | Bestel | |
| 5,936,825 A | 8/1999 | DuPont | |
| 5,949,641 A | 9/1999 | Walker et al. | |
| 5,953,193 A | 9/1999 | Ryan | |
| 5,957,712 A | 9/1999 | Stepniak | |
| 6,022,247 A | 2/2000 | Akiyama et al. | |
| 6,040,538 A | 3/2000 | French et al. | |
| 6,042,407 A | 3/2000 | Scull et al. | |
| 6,069,321 A | 5/2000 | Wagener et al. | |
| 6,103,975 A * | 8/2000 | Krabs et al. | 174/74 A |
| 6,130,394 A | 10/2000 | Hogl | |
| 6,168,447 B1 | 1/2001 | Stepniak et al. | |
| 6,179,639 B1 * | 1/2001 | Kuwahara et al. | 439/282 |
| 6,205,029 B1 | 3/2001 | Byrne et al. | |
| 6,213,799 B1 * | 4/2001 | Jazowski et al. | 439/181 |
| 6,220,888 B1 | 4/2001 | Correa | |
| 6,227,908 B1 | 5/2001 | Aumeier | |
| 6,250,950 B1 | 6/2001 | Pallai | |
| 6,280,659 B1 | 8/2001 | Sundin | |
| 6,332,785 B1 | 12/2001 | Muench, Jr. et al. | |
| 6,338,637 B1 | 1/2002 | Muench, Jr. et al. | |
| 6,362,445 B1 | 3/2002 | Mearchand et al. | |
| 6,364,216 B1 | 4/2002 | Martin | |
| 6,416,338 B1 | 7/2002 | Berlovan | |
| 6,453,776 B1 | 9/2002 | Beattie et al. | |
| 6,504,103 B1 | 1/2003 | Meyer et al. | |
| 6,517,366 B2 | 2/2003 | Bertini et al. | |
| 6,520,795 B1 | 2/2003 | Jazowski | |

| | | |
|---|---|---|
| 6,538,312 B1 | 3/2003 | Peterson et al. |
| 6,542,056 B2 | 4/2003 | Nerstron et al. |
| 6,566,996 B1 | 5/2003 | Douglass et al. |
| 6,585,531 B1 | 7/2003 | Stepniak et al. |
| 6,664,478 B2 | 12/2003 | Mohan et al. |
| 6,674,159 B1 | 1/2004 | Peterson et al. |
| 6,689,947 B2 | 2/2004 | Ludwig |
| 6,705,898 B2 | 3/2004 | Pechstein et al. |
| 6,709,294 B1 | 3/2004 | Cohen et al. |
| 6,733,322 B2 | 5/2004 | Boemmel et al. |
| 6,744,255 B1 | 6/2004 | Steinbrecher et al. |
| 6,790,063 B2 | 9/2004 | Jazowski et al. |
| 6,796,820 B2 | 9/2004 | Jazowski et al. |
| 6,809,413 B1 | 10/2004 | Peterson et al. |
| 6,811,418 B2 | 11/2004 | Jazowski et al. |
| 6,830,475 B2 | 12/2004 | Jazowski et al. |
| 6,843,685 B1 | 1/2005 | Borgstrom et al. |
| 6,888,086 B2 | 5/2005 | Daharsh et al. |
| 6,905,356 B2 | 6/2005 | Jazowski et al. |
| 6,936,947 B1 | 8/2005 | Leijon et al. |
| 6,939,151 B2 | 9/2005 | Borgstrom et al. |
| 6,972,378 B2 | 12/2005 | Schomer et al. |
| 6,984,791 B1 | 1/2006 | Meyer et al. |
| 7,018,236 B2 | 3/2006 | Nishio et al. |
| 7,019,606 B2 | 3/2006 | Williams et al. |
| 7,044,760 B2 | 5/2006 | Borgstrom et al. |
| 7,044,769 B2 | 5/2006 | Zhao et al. |
| 7,050,278 B2 | 5/2006 | Poulsen |
| 7,059,879 B2 | 6/2006 | Krause et al. |
| 7,077,672 B2 * | 7/2006 | Krause et al. ............ 439/181 |
| 7,079,367 B1 | 7/2006 | Liljestrand |
| 7,083,450 B1 | 8/2006 | Hughes |
| 7,104,822 B2 | 9/2006 | Jazowski et al. |
| 7,104,823 B2 | 9/2006 | Jazowski et al. |
| 7,108,568 B2 | 9/2006 | Jazowski et al. |
| 7,134,889 B2 | 11/2006 | Hughes et al. |
| 7,150,098 B2 | 12/2006 | Borgstrom et al. |
| 7,168,983 B2 | 1/2007 | Graf et al. |
| 7,170,004 B2 | 1/2007 | Gramespacher et al. |
| 7,182,647 B2 | 2/2007 | Muench et al. |
| 7,212,389 B2 | 5/2007 | Hughes |
| 7,216,426 B2 * | 5/2007 | Borgstrom et al. ............ 29/883 |
| 7,234,980 B2 | 6/2007 | Jazowski et al. |
| 7,247,061 B2 | 7/2007 | Hoxha et al. |
| 7,247,266 B2 | 7/2007 | Bolcar |
| 7,258,585 B2 | 8/2007 | Hughes et al. |
| 7,278,889 B2 | 10/2007 | Muench et al. |
| 7,341,468 B2 | 3/2008 | Hughes et al. |
| 2001/0008810 A1 | 7/2001 | George et al. |
| 2002/0055290 A1 | 5/2002 | Jazowski et al. |
| 2003/0228779 A1 | 12/2003 | Jazowski et al. |
| 2004/0121657 A1 | 6/2004 | Muench et al. |
| 2005/0208808 A1 | 9/2005 | Jazowski et al. |
| 2005/0212629 A1 | 9/2005 | William et al. |
| 2005/0260876 A1 | 11/2005 | Krause et al. |
| 2006/0110983 A1 | 5/2006 | Muench et al. |
| 2006/0160388 A1 | 7/2006 | Hughes et al. |
| 2006/0216992 A1 | 9/2006 | Hughes et al. |
| 2007/0026713 A1 | 2/2007 | Hughes et al. |
| 2007/0026714 A1 | 2/2007 | Hughes et al. |
| 2007/0032110 A1 | 2/2007 | Hughes et al. |
| 2007/0097601 A1 | 5/2007 | Hughes et al. |
| 2007/0108164 A1 | 5/2007 | Muench et al. |
| 2008/0160809 A1 | 7/2008 | Hughes et al. |

FOREIGN PATENT DOCUMENTS

| | | |
|---|---|---|
| DE | 3521365 | 2/1987 |
| DE | 19906972 | 2/1999 |
| EP | 062494 | 11/1994 |
| EP | 0782162 | 7/1997 |
| EP | 0957496 | 11/1999 |
| FR | 2508729 | 12/1982 |
| GB | 105227 | 2/1918 |
| GB | 2254493 | 10/1992 |
| JP | S62-198677 | 12/1987 |
| JP | S63-93081 | 6/1988 |
| JP | H1-175181 | 7/1989 |
| JP | H3-88279 | 9/1991 |
| JP | H4-54164 | 5/1992 |
| WO | WO 00/41199 | 7/2000 |

OTHER PUBLICATIONS

U.S. Appl. No. 11/738,995, Steinbrecher et. al.
U.S. Appl. No. 11/738,948, Hughes et. al.
U.S. Appl. No. 11/738,941, Hughes et. al.
U.S. Appl. No. 11/688,673, Hughes et. al.
U.S. Appl. No. 11/688,648, Hughes et. al.
U.S. Appl. No. 11/677,703, Hughes et. al.
U.S. Appl. No. 11/676,861, Hughes et. al.
U.S. Appl. No. 11/674,228, Roscizewski et al.
U.S. Appl. No. 11/931,240, Hughes et al.
U.S. Appl. No. 12/047,094, Hughes.
U.S. Appl. No. 12/072,164, Hughes et al.
U.S. Appl. No. 12/072,193, Hughes et al.
U.S. Appl. No. 12/082,717, Hughes et al.
U.S. Appl. No. 12/082,719, Hughes et al.
U.S. Appl. No. 12/072,513, Hughes.
U.S. Appl. No. 12/072,333, Hughes.
U.S. Appl. No. 12/072,498, Hughes.
Loadbreak Apparatus Connectors Service Information 500-26, Cooper Power Systems, May 2003, Waukesha, WI.
Deadbreak Apparatus Connectors Electrical Apparatus, Cooper Power Systems, Jul. 1999, Marketing Material.
Link-Op 600A Operable Connector System, Marketing Material.
Installation Instructions, 650LK-B Link Operable Connector System (Bolted) May 1, 1989.
G&W Electric Co.; "Breakthrough in Switching Technology; Solid Dielectric Switchgear"; Oct. 2001; Blue Island, IL.
Cooper Power Systems; "Padmounted Switchgear; Type RVAC, Vacuum-Break Switch, Oil-Insulated or SF.sub.6-Insulated; Electrical Apparatus 285-50"; Jul. 1998.
Cooper Power Systems; "Padmounted Switchgear; Type MOST Oil Switch; Electrical Apparatus 285-20"; Jul. 1998.
Cooper Power Systems; "Molded Rubber Products; 600 A 35 kV Class Bol-T.TM. Deadbreak Connector; Electrical Apparatus 600-50"; Jan. 1990.
Cooper Power Systems; "Padrnounted Switchgear; Kyle.RTM. Type VFI Vacuum Fault Interrupter; Electrical Apparatus 285-10", Jan. 1998.
"Loadbreak Appatus Connectors, 200 A 25kV Class—Expanded Range Loadbreak Elbow Connector, Electrical Apparatus 500-28"; Cooper Power Systems; pp. 1-4; (Jan. 2004).
Kevin Fox, "The Cooper Posi-Break.TM. Solution to Separable Connector Switching Problems at Wisconsin Electric Power Company," Component Products, Bulletin No. 98065, copyright 1998 Cooper Power Systems, MI 10/98 5M, 2 total pages.
"The Cooper Posi-Break.TM., Elbow and Cap, Engineered Solution Increases Strike Distance and Improves Reliability," copyright 1998 Cooper Power Systems, Inc., Bulletin 98014, MI 398/15M, 6 total pages.
Loadbreak Apparatus Connectors, "200 A 25 kV Class Loadbreak Bushing Insert," Service Information 500-26, Cooper Power Systems, May 2003, pp. 1-2.
Loadbreak. Apparatus Connectors, "200 A kV Class Cooper Posi-Break.TM. Expanded Range Loadbreak Elbow Connector," Service Information 500-29, Cooper Power Systems, Jan. 2004, pp. 1-4.
Product Brief, "Latched Elbow Indicator," Cooper Power Systems, Bulletin 94014, Apr. 1994, 1 total page.
"Stick-OPerable 600-Amp Connector Systems," *Elastimold, Amerace Corporation*, Feb. 1984, 11 pages.
"Molded Rubber Products, 600 A 15 kV Class T-OP™ II Deadbreak Connector Electrical Apparatus 600-12," *Cooper Power Systems*, Jul. 2005, pp. 1-4.
"Molded Rubber Products, 600 A 15 and 25 kV Deadbreak Accessories, Tools, Replacement Parts Electrical Apparatus 600-46"; *Cooper Power Systems*, Jul. 1997, pp. 1-4.
"Molded Rubber Products, 600 A 25 kV Class BT-TAP™ Deadbreak Connecor Electrical Apparatus, 600-35," *Cooper Power Systems*, Mar. 2003, pp. 1-5.

"Deadbreak Apparatus Connectors, 600 A 15/25 kV Class Bo-T™ Deadbreak Connector Electrical Apparatus 600-10," *Cooper Power Systems*, Aug. 2002, 6 pages.

"Deadbreak Apparatus Connector, 600 A 25 kV Class Bushing Adapter for T-OP™ II Connector Systems (including LRTP and Bushing Extender) Electrical Appparatus 600-38," *Cooper Power Systems*, Jun. 1997, pp. 1-4.

"Loadbreak Apparatus Connectors, 200 A 15 kV Class Loadbreak Bushing Insert 500-12," *Cooper Power Systems*, Nov. 1995, pp. 1-2.

"T-OP™ II: How Many Sticks Does It Take to Operate Your 600 Amp Terminator System?," *Cooper Power Systems*, Jul. 1994, 4 pages.

"Installation & Operation Instructions 168ALR, Access Port Loadbreak Elbow Connectors"; *Elastimold IS-168ALR (Rev C)*; pp. 1-5; (Feb. 1, 1994).

"Operating Instructions 200TC-2"; *Elastimold IS-200TC (Rev-A)*; pp. 1-2; (Feb. 26, 1995).

"Surge Arresters"; *Elastimold Catalog*; pp. 26-27; (2001).

"Surge Arresters, Metal Oxide Varistor elbow (M.O.V.E.™) Surge Arrester Electrical Apparatus 235-65"; *Cooper Power Systems*; pp. 1-4; Dec. 2003.

"Surge Arresters, Metal Oxide Elbow Surge Arrester Electrical Apparatus 235-65"; *Cooper Power Systems*; pp. 1-4; Jan. 1991.

"Surge Arresters, Metal Oxide Varistor (MOV) Parking Stand Surge Arrester Electrical Apparatus 235-68"; *Cooper Power Systems*; pp. 1-3; Apr. 2002.

"INJPLUG35, 35 kV Amp Loadbreak Injection Plug Operating and Installation Instructions"; *Cooper Power Systems*; p. 1; (Sep. 2002).

"Loadbreak Apparatus Connectors, 200 A 15 kV Class Loadbreak Elbow Connector, Electrical Apparatus 500-10"; *Cooper Power Systems*; pp. 1-4; (Feb. 2004).

"Loadbreak Apparatus Connectors, 200 A 15 kV and 25 kV Class Elbow Installation Instructions, Service Information S500-10-1"; *Cooper Power Systems*; pp. 1-4; (Feb. 2001).

"Loadbreak Apparatus Connectors, 200 A 15kV Class Loadbreak Bushing Insert 500-12"; *Cooper Power Systems*; pp. 1-2; (Nov. 1995).

"Loadbreak Apparatus Connectors, 200 A 15kV Class Loadbreak Rotatable Feedthru Insert; Electrical Apparatus 500-13"; *Cooper Power Systems*; pp. 1-2; (Apr. 2001).

"Loadbreak Apparatus Connectors, 200 A 25 kV Class—Expanded Range Loadbreak Elbow Connector, Electrical Apparatus 500-28"; *Cooper Power Systems*; pp. 1-4; (Jan. 2004).

"Loadbreak Apparatus Connectors, 200 A 25 kV Class Rotatable Feedthru Insert, Electrical Apparatus 500-30"; *Cooper Power Systems*; pp. 1-2; (Jun. 1999).

"Loadbreak Apparatus Connectors, 200 A 35 kV Class Three-Phase Loadbreak Injection Elbow Installation Instructions, Service Information S500-55-2"; *Cooper Power Systems*; pp. 1-6; (Apr. 1999).

Cooper Power Systems, *Deadbreak Apparatus Connectors*, "600 A 15/25 kV Clas Bol-T™ Deadbreak Connector", Electrical Apparatus 600-30, pp. 1-6, Feb. 2003.

Cooper Power Systems, *Deadbreak Apparatus Connectors*, "600 A 15/25 kV Class PUSH-OP® Deadbreak Connector", Electrical Apparatus 600-33, pp. 1-4, Nov. 2004.

Cooper Power systems, *Molded Rubber Products*, "600 A 15/25 kV Class T-OP™ II Deadbreak Connector", Electrical Apparatus 600-32, pp. 1-4, Jul. 2005.

Cooper Power Systems, *OEM Equipment*, "Four-Position Sectionalizing Loadbreak Switches", Electrical Apparatus 800-64, pp. 1-8, Dec. 2001.

\* cited by examiner

TWO-MATERIAL SEPARABLE INSULATED CONNECTOR

CROSS REFERENCE TO RELATED APPLICATIONS

This patent application claims priority to U.S. patent application Ser. No. 11/809,508, entitled "Jacket Sleeve with Grippable Tabs for a Cable Connector," filed Jun. 1, 2007, the complete disclosure of which is hereby fully incorporated herein by reference.

TECHNICAL FIELD

The invention relates generally to separable insulated connectors for electric power systems. More specifically, the invention relates to a separable insulated connector made of two separate materials—a stiff material and a soft material.

BACKGROUND OF THE INVENTION

Separable insulated connectors provide an electric connection between components of an electric power system. More specifically, separable insulated connectors typically connect sources of energy—such as cables carrying electricity generated by a power plant—to energy distribution systems or components thereof, such as switchgears and transformers.

Two common types of separable insulated connectors that are used for this purpose are T-body connectors and elbow connectors. Conventional elbow connectors and T-body connectors are installed into electric power systems and used therein according to similar steps. Thus, the connections described herein with respect to a conventional elbow connector are largely applicable to a conventional T-body connector, and vice-versa.

Separable insulated connectors can connect power cables to an energy distribution component, such as a switchgear or transformer. The power cables are inserted into an opening on one end (usually the bottom end) of the connector. After the cable is inserted into the connector, the connector then can be connected to the energy distribution component. More specifically, elbow connectors often include a bushing with an opening at the top end—and bushings in T-body connectors often include two openings at the top end—that can be connected to an energy distribution component. Alternatively, sometimes another apparatus can be connected to the bushings in the connectors, such as a plug or a probe, which then can be connected to an energy distribution component.

Conventional separable insulated connectors often include an external shell and a semi-conductive insert or faraday cage. The purpose of the insert or faraday cage is to shield all gaps of air within the mating components of the separable insulated connector, as these air gaps can cause corona discharge within the connector. This discharge can occur if there is a voltage drop across the air gaps, and the discharge can corrode the rubber materials often used to make the separable insulated connector. The faraday cage ensures that the various mating components have the same electric potential, and thus prevents corona discharge within the mating components.

The external shell and the semi-conductive insert can be made from a conductive or semi-conductive material. As used throughout this application, a "semi-conductive" material can refer to rubber or any other type of material that carries current, and thus can include conductive materials. The shell and semi-conductive insert are often made of a rubber material, such as ethylene propylene dienemonomer (EPDM) rubber, thermoplastic rubbers (TPRs), silicone rubber, or variety of other suitable materials known to those having ordinary skill in the art and having the benefit of the present disclosure.

The EPDM rubber or other suitable materials can be made using a variety of methods and proportions of components, such that the EPDM rubber can be stiff, soft, or somewhere in between. One particular difficulty that manufacturers of separable insulated connectors face is in determining how flexible a material (such as EPDM rubber) to use in manufacturing the components of a connector. This difficulty arises because a soft shell or insert has certain advantages and disadvantages when compared to a stiff shell or insert.

For example, given that the shell of the connector may be connected to a cable, plug, probe, or energy distribution component, a soft shell may be more flexible in accommodating such cables, plugs, probes, or energy distribution components of a variety of sizes when compared to a stiff shell. The accommodation of an increased variety of cables, plugs, probes, or energy distribution components allows greater flexibility and adaptability for the entire electric power system. The same advantage is true for a soft insert, when compared with a stiff insert.

However, soft shells and inserts may not provide the strength and durability that is desirable for separable insulated connectors. A soft shell or insert may be more likely to warp in case of a power surge or fault current, and may be more likely to accidentally disconnect from the cable and/or energy distribution component. A power surge or fault current can create magnetic forces that repel a soft shell of a separable insulated connector off from a bushing connected thereto. Additionally, a soft shell or insert may not be easily moved, disconnected, or adjusted without tearing or causing other damage to the connector.

Shells and inserts for conventional separable insulated connectors are therefore often made from a material toward the middle of the stiff and soft spectrum, to capitalize on some of the advantages of each. With such an approach, however, the shells and inserts also retain some of the disadvantages of a stiff or soft material, and fail to maximize the advantages of each material.

Thus a need in the art exists for a separable insulated connector in an electric power system that addresses the disadvantages found in the prior art. Specifically, a need in the art exists for a separable insulated connector that includes a shell and/or semi-conductive insert that capitalizes on the advantages of both a soft material and a stiff material, while minimizing the disadvantages associated with each.

SUMMARY OF THE INVENTION

The invention provides a separable insulated connector for use in an electric power system that includes a shell and/or semi-conductive insert that is configured to capitalize on the advantages of both a soft material and a stiff material, while minimizing the disadvantages associated with each. Specifically, the invention provides a separable insulated connector that includes a shell and/or semi-conductive insert made of at least two materials—one relatively stiff and one relatively soft. The separable insulated connector can be made of a soft material in areas on the connector where greater flexibility is desired. Conversely, the separable insulated connector can be made of a stiff material in areas where greater strength is desired.

In one aspect, the invention provides a shell for a separable insulated connector made of two materials—one stiff and one soft. The stiff and soft materials can both be rubber, such as EPDM rubber, though the rubber can be manufactured differently to achieve the different strength and flexibility. Other materials such as thermoplastic rubbers (TPRs), silicone rubber, or other suitable materials known to those having ordinary skill in the art and having the benefit of the present disclosure can be used instead of EPDM rubber. Any reference in this disclosure to a specific type of material, such as EPDM rubber, shall be intended as an example, and not to limit the scope of the invention.

Regardless of the particular material used, the soft material can be used in areas on the shell where increased flexibility is desired. For example, the soft material can be used to make the area of the shell that connects to cables, plugs, probes, or energy distribution components.

Conversely, the stiff material can be used in other areas on the shell, where increased strength is desired. For example, the stiff material can be used to make the longitudinal portion of the connector, to protect against warping in case of a power surge or lightening strike. The stiff material also can be used in making a "pulling eye" or handle for adjusting the connector.

In another aspect, the invention provides a semi-conductive insert for a separable insulated connector that is made of at least one stiff material and one soft material. As with the materials used in making the shell, the stiff and soft materials both can be EPDM rubber. Each material can be used in areas on the insert where the respective advantages of each material are desired. For example, the semi-conductive insert can include a portion for contacting a cable, plug, probe, or energy distribution component that is made of the soft material, and the remainder of the insert can be made of the stiff material.

In yet another aspect, the invention provides a separable insulated connector that includes at least one stiff area and one soft area. The separable insulated connector can comprise an elbow connector, a T-body connector, or any other type of separable insulated connector known to those having ordinary skill in the art and having the benefit of the present disclosure. The stiff and soft areas can be located on a shell of the separable insulated connector or on a semi-conductive insert disposed within the separable insulated connector. Alternatively, the separable insulated connector can include a shell and a semi-conductive insert, both of which can include a stiff area and a soft area. By including both a stiff area and soft area, the separable insulated connector can capitalize on the advantages associated with both stiff and soft materials in the manufacture of conventional separable insulated connectors.

These and other aspects, objects, features and embodiments of the invention will become apparent to a person of ordinary skill in the art upon consideration of the following detailed description of illustrative embodiments, which include the best mode for carrying out the invention as presently perceived.

DETAILED DESCRIPTION OF EXEMPLARY EMBODIMENTS

The following description of exemplary embodiments refers to the attached drawings, in which like numerals indicate like elements throughout the several figures.

Figure 1:
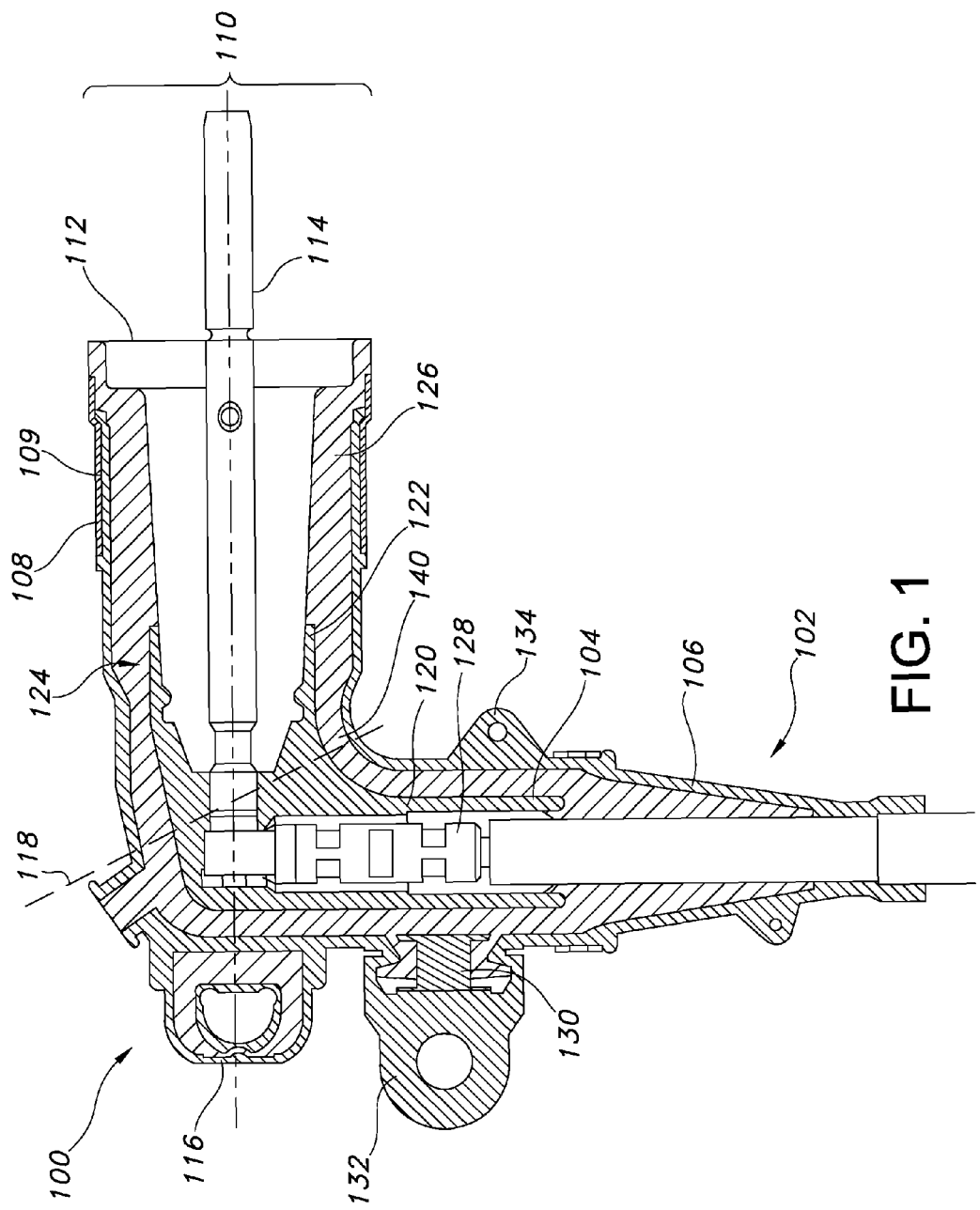
FIG. 1 is a cross-sectional side view of an elbow connector having a stiff area and a soft area, according to an exemplary embodiment.

FIG. 1 is a cross-sectional side view of an elbow connector 100 having a stiff area 106 and a soft area 108, according to an exemplary embodiment. The elbow connector 100 includes a shell 102 that includes a bushing entrance 110 having an opening 112. In the illustrated embodiment, a probe 114 is partially disposed within the opening 112 of the bushing entrance 110. In alternative exemplary embodiments, the opening 112 can be used to attach the elbow connector 100 to a switchgear, transformer, or other energy distribution component to which the elbow connector 100 may be connected. In an exemplary embodiment, as shown in FIG. 1, the probe 114 or other similar bushing may be inserted into the opening 112, and then the probe 114 may be inserted into an energy distribution component.

The shell 102 of the elbow connector 100 also can include a pulling eye 116. The pulling eye 116 can function as a handle for the elbow connector 100. The pulling eye 116 can be pulled or pushed to install the elbow connector 100 on an energy distribution component, to adjust the position of the elbow connector 100, or to disconnect the elbow connector 100 from an energy distribution component.

In an exemplary embodiment, the elbow connector 100 also can include a semi-conductive insert 104. The semi-conductive insert 104 can be disposed within the shell 102, as shown in FIG. 1. In a particular exemplary embodiment, the semi-conductive insert 104 can include an upper section 124 that is disposed within the bushing entrance 110 of the shell 102. In such an embodiment, the upper section 124 of the semi-conductive insert 104 can include an opening configured to accept a cable, plug, probe 114, or another an energy distribution component inserted into the bushing entrance 110 of the shell 102.

In another exemplary embodiment, the semi-conductive insert 104 can be made of the same material used in the manufacture of the shell 102. For example, the semi-conductive insert 104 can comprise EPDM rubber with carbon black mixed in, thereby providing the semi-conductive property for the semi-conductive insert 104. In an alternative embodiment, the semi-conductive insert 104, as well as the shell 102, can comprise any other type of suitable semi-conductive material known to those having ordinary skill in the art and having the benefit of the present disclosure. Examples of these materials include thermoplastic rubbers (TPRs) and silicone rubber.

Figure 2:
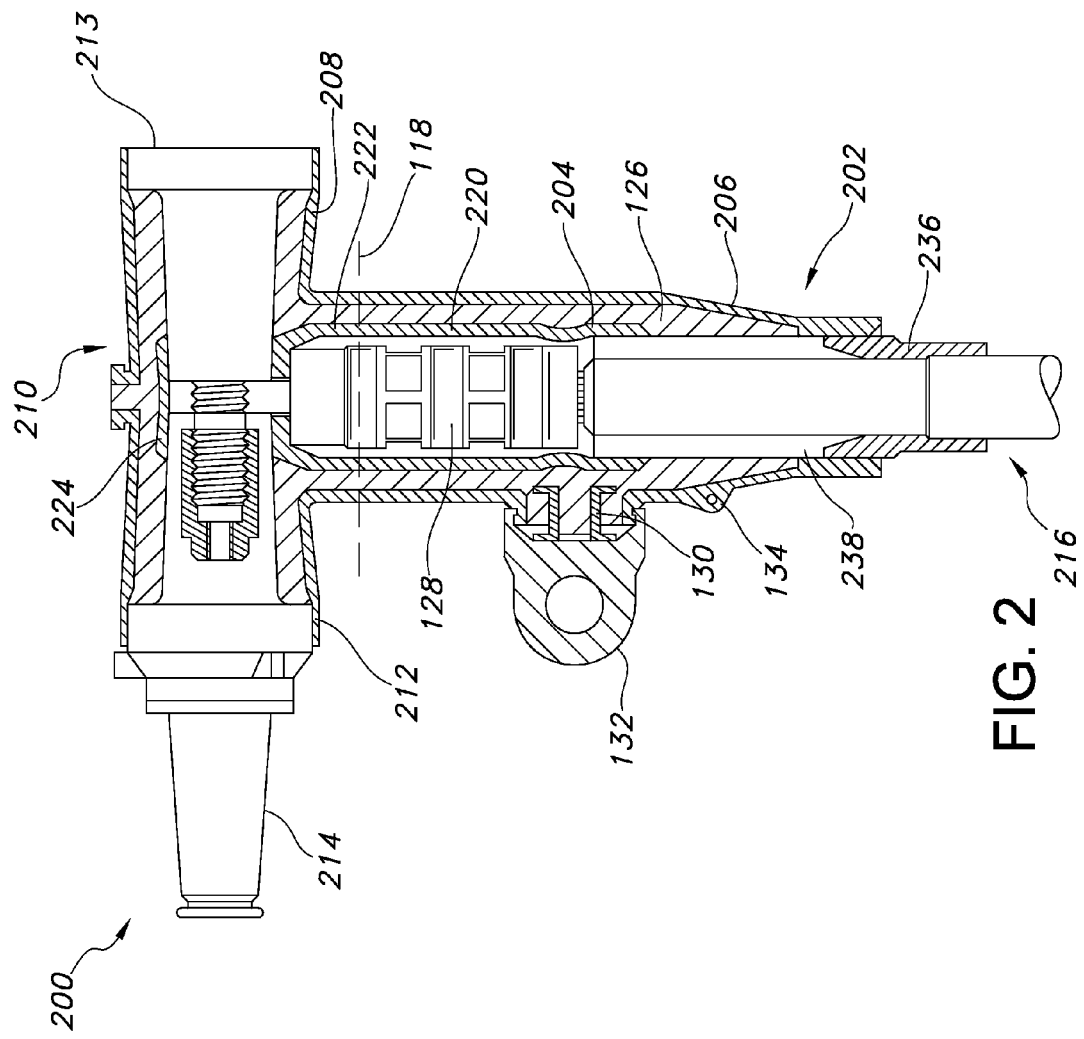
FIG. 2 is a cross-sectional side view of a T-body connector having a stiff area and a soft area, according to an exemplary embodiment.

In various exemplary embodiments, the elbow connector 100 also can comprise a variety of additional components and features. For example, the elbow connector 100 can utilize a cable adapter. An exemplary cable adapter 216 is shown in FIG. 2, shown inserted into an exemplary T-body connector 200, which will be discussed in more detail with reference to FIG. 2. A cable adapter 216 can be inserted into the semi-conductive insert 104 of the elbow connector to increase the variety of cables that can be used with the connector. As shown in FIG. 2, an exemplary cable adapter 216 can include a semi-conductive section 236 and an insulating section 238. Both sections 236, 238 can comprise EPDM rubber, with the semi-conductive section 236 further including carbon black or other suitable conductive materials.

In exemplary embodiments, each cable adapter 216 can be designed to accept a range of cable widths, each width within the range being sufficiently narrow to fit within the opening provided, and sufficiently wide to be secured within the cable adapter 216. Each elbow connector 100—or in more specific exemplary embodiments, each semi-conductive insert 104—then can be designed to accept a range of cable adapter 216 widths, thereby enabling each elbow connector to accept a large range of cable widths.

In other exemplary embodiments, the elbow connector 100 also can include a compression connector 128. A compression connector 128 can be disposed within the semi-conductive insert 104 and can crimp a cable inserted into the elbow connector 100, holding it in place and allowing power to transfer from the cable to the elbow connector 100. In an exemplary embodiment, the top of the conductive compression connector 128 can contact—whether directly or indirectly—a cable, plug, probe 114, or energy distribution component inserted into the bushing entrance 110 of the elbow connector 100, as shown in FIG. 1.

Additionally, in exemplary embodiments, the elbow connector 100 can include a capacitive test point 130. The capacitive test point 130 can be molded on the shell 102 of the elbow connector 100. The capacitive test point 130 can provide a location on which a fault indicating device, or other similar device, can be mounted to determine whether problems or irregularities exist with the electric power passing through the elbow connector 100. In an exemplary embodiment, a protective cap 132 can be placed on the capacitive test point 130 when it is not in use.

In exemplary embodiments, as shown in FIG. 1, the shell 102 of the elbow connector 100 also can include a ground wire tab 134, to which a wire can be attached and grounded. Because the shell 102 can be made of semi-conductive EPDM rubber, the ground wire can provide ground shield continuity for the elbow connector 100, thereby providing deadfront safety for the shell 102. In other words, the grounded shell 102 can allow for operators to touch the exterior of the elbow connector 100 safely, thereby removing or reducing the risk of accidental electric shock.

In exemplary embodiments, the shell 102 of the elbow connector 100 can include at least one soft area 108 and at least one stiff area 106. Various measurements of "stiffness" and "softness" exist and are known to one of ordinary skill in the art having the benefit of the present disclosure. For example, such exemplary measurements include the tensile stress, elongation, modulus, and durometer of the materials. The modulus measurements, which refer to the amount of pressure required to stretch (or elongate) the material a given percentage, can be taken at a variety of elongation percentages.

Regardless of the measurement used, in various exemplary embodiments, the terms "soft" and "stiff" can refer to the relative hardness of two different materials. For example, in particular embodiments, a soft material can comprise a material having between 1% and 15% lower tensile stress than a stiff material. Alternatively, a soft material can comprise a material having between 1% and 40% greater elongation than a stiff material and/or a material having between 5% and 25% lower durometer than a stiff material. In another embodiment, a soft material can comprise a material having between 10% and 60% lower modulus at a variety of elongation percentages (i.e., at 50%, 75%, and 100% elongation) than a stiff material. In alternative embodiments, the terms "soft" and "stiff" can refer to absolute values (as opposed to relative values) of exemplary hardness measurements.

In an exemplary embodiment, a soft area 108 can be located on or around the opening 112 of the bushing entrance 110. Such a soft area 108 can provide increased flexibility and elasticity for the opening 112 of the bushing entrance 110. The soft area 108 can allow for the insertion of a greater variety of cables, plugs, probes 114, and/or energy distribution components into the opening of the shell 102 when compared to shells of conventional separable insulated connectors. The soft area 108 also can allow for easier installation and removal of the connector 100 to or from an energy distribution component.

In an exemplary embodiment, where the soft area 108 is located on or around the opening 112 of the bushing entrance 110, or where the entire shell 102 comprises a soft material, the shell 102 also can include a sleeve 109 surrounding the bushing entrance 110. Such a sleeve 109 can be made from a relatively stiff material, and thus provide strength and sturdiness to the shell 102. Thus, while the soft area 108 can provide the desirable flexibility to allow insertion of a bushing, the sleeve 109 can provide sturdiness to improve the tightness of the connection between the elbow connector 100 and the bushing inserted therein. The sleeve 109 also can provide many of the other advantages associated with stiff materials, such as enhanced durability and resistance to warping due to a power surge or fault current when compared to a soft material.

Yet another benefit of the sturdiness provided by the sleeve 109 is that the bushing entrance 110 may be less likely to "pop off" or get disconnected from the switchgear, transformer, or other energy distribution component to which the elbow connector 100 is connected. Without a sleeve 109, a soft material—whether part of the shell 102 or insulating material 126—located at or near the bushing entrance 110 may turn inside out during a fault close. A fault close can cause a blast or explosion, and if the elbow connector 100 or the bushing entrance 110 turn inside out, the forces of the explosion may be directed toward the operator, instead of away from the operator.

In exemplary embodiments, the shell 102 of the elbow connector 100 also can include at least one stiff area 106. For example, as shown in FIG. 1, the stiff area 106 can include the portion of the shell 102 that includes the angle 140 formed by the bending of the elbow connector 100. In such an embodiment, the stiff area 106 can reduce or prevent the elbow connector 100 from straightening in the event of a power surge or lightening strike.

In another exemplary embodiment, stiff area 106 of the shell 102 also can include the pulling eye 116. The stiff material in the pulling eye 116 can provide a strong, durable handle for installing, removing, or adjusting the elbow connector 100, which is less likely to tear or shear compared to a softer material. Additionally, the stiff material can provide increased hoop stress in the pulling eye 116, such that most of the force created from pulling on the pulling eye 116 can result in actually moving the pulling eye 116. Conversely, if the pulling eye 116 is made of a softer, more flexible material, the pulling eye 116 may act as a shock absorber, thereby reducing the amount of force that will be applied to moving the pulling eye 116 and the elbow connector 100.

In exemplary embodiments, the stiff area 106 and the soft area 108 of the shell 102 can comprise a variety of materials. In various specific embodiments, both the stiff area 106 and the soft area 108 can comprise EPDM rubber, another type of rubber, or any other suitable material known to those having ordinary skill in the art and having the benefit of the present disclosure. In an exemplary embodiment, the shell 102 can comprise a mixture of EPDM rubber and conductive carbon black, thereby making the shell 102 semi-conductive. The relative stiffness or softness of the EPDM rubber can be controlled by adjusting the components mixed with the EPDM rubber. For example, increasing the amount of carbon black mixed with the EPDM rubber can increase the stiffness in the mixture. Conversely, mixing EPDM rubber with a lower amount of carbon black can make the mixture softer. Other factors beyond the amount of carbon black can affect the relative softness or stiffness of the mixture. Such factors are known to those having ordinary skill in the art and having the benefit of the present disclosure.

FIG. 1 includes a dividing line, illustrating an exemplary border 118 between the soft area 108 and the stiff area 106. In various exemplary embodiments, the border 118 between the stiff and soft areas 106, 108 can be at a variety of suitable locations along the shell 102. In such embodiments, the border 118 between the soft area 108 and stiff area 106 of the shell 102 can be chosen to provide the desired stiffness in the "pulling" section and the desired softness in the "connection" section.

In a particular exemplary embodiment, the soft area 108 and stiff area 106 of the shell 102 can form two separate sections that can be bonded together during the manufacturing process. In an exemplary embodiment, these two distinct sections can overlap at the joint between them. For example, the soft area 108 can include an opening that is slightly wider than a corresponding opening in the stiff area 106. In such an embodiment, a small portion of the stiff area 106 can be inserted into the soft area 108. In an alternative embodiment, the soft area 108 and the stiff area 106 can be abutted with each other, or in other words, the soft area 108 can border the stiff area 106 without significant overlap between the two. In any of these exemplary embodiments, the materials of the stiff and soft areas 106, 108 can be bonded together.

In embodiments where the soft area 108 and stiff area 106 form two separate sections, the two sections can be joined together by a variety of methods. In one exemplary embodiment, the soft area 108 and stiff area 106 can be formed separately, such as by using liquid EPDM rubber and separate steel mandrels or molds. The two sections then can be adjoined before they are completely cooled and hardened, thereby allowing the two sections to bond together while they cool.

In another exemplary embodiment, the separate soft area 108 and stiff area 106 sections can be joined after the two pieces have been cooled. In such an embodiment, the two sections can be held together by an adhesive or other bonding agent. In another exemplary embodiment, insulating material 126, which will be discussed in more detail below, can be bond the two sections together upon cooling.

In an alternative exemplary embodiment, the soft area 108 and stiff area 106 of the shell 102 may not form two separate sections. Rather, the shell 102 may include a single piece that includes both a soft area 108 and stiff area 106. In an exemplary embodiment, such a single-piece shell 102 can be formed by using a steel mandrel or mold that has two separate holes through which the soft material and stiff material can be injected. In such an embodiment, the two holes can be located on opposite sides of the steel mandrel or mold. For example, the soft material can be injected through a hole on the side of the mold that can be used to form the portion of the shell 102 that contains the soft area 108, and the stiff material can be injected through a hole on the other side of the mold. After injection, the soft material and stiff material can meet and bond with each other within the mold, thereby forming a single-piece shell 102 comprising both a soft area 108 and a stiff area 106.

In another exemplary embodiment, the semi-conductive insert 104 can include at least one soft area 122 and at least one stiff area 120, as described previously with respect to the shell 102. For example, in an exemplary embodiment, a soft area 122 can be located on the upper section 124 of the semi-conductive insert 104 that is disposed within the bushing entrance 110 of the shell 102. The increased flexibility in the soft area 122 of the upper section 124 of the semi-conductive insert 104 can allow for the insertion of a greater variety of cables, plugs, probes, and/or energy distribution components into the semi-conductive insert 104 when compared to semi-conductive inserts of conventional separable insulated connectors.

In exemplary embodiments, the semi-conductive insert 104 of the elbow connector 100 also can include at least one stiff area 120. The stiff area 120 of the semi-conductive insert 104 can correspond with the portion of the semi-conductive insert 104 in which the cable adapter 216 can be inserted. The stiff area 120 also can include the portion of the semi-conductive insert 104 that corresponds with the pulling eye 116 of the shell 102. In another exemplary embodiment, as shown in FIG. 1, and as described previously with respect to the shell 102, the stiff area 120 can include the portion of the semi-conductive insert 104 that corresponds with the angle 140 of the elbow connector 100. In such an embodiment, as with the stiff area 106 of the shell 102, the stiff area 120 of the semi-conductive insert 104 can reduce or prevent any straightening of the elbow connector 100 in the event of a power surge or lightening strike.

A semi-conductive insert 104 that includes at least one soft area 122 and at least one stiff area 120, such as the exemplary semi-conductive insert 104 shown in FIG. 1, can be manufactured by a variety of methods, as described previously with respect to the shell 102. For example, the soft area 122 and stiff area 120 of the semi-conductive insert 104 can form two separate sections that can be bonded together during the manufacturing process, which can utilize steel mandrels or molds. In alternative exemplary embodiments, the separate sections can be abutted with each other, or there can be overlap between the two sections.

In an exemplary embodiment, the exemplary border 118 between the soft area 108 and the stiff area 106 of the shell 102 also can apply to the soft area 122 and stiff area 120 of the semi-conductive insert 104. In an alternative embodiment, the border between the soft area 122 and stiff area 120 of the semi-conductive insert 104 may not be in line with the corresponding border 118 for the shell 102. In this case, the border between the soft area 122 and stiff area 120 of the semi-conductive insert 104 can be chosen to provide the desired stiffness in the "pulling" section and the desired softness in the "connection" section.

In another exemplary embodiment, the separate soft area 122 and stiff area 120 sections can be joined after the two pieces have been cooled. In such an embodiment, the two sections can be held together by an adhesive or other bonding agent. In yet another exemplary embodiment, the soft area 122 and stiff area 120 of the semi-conductive insert 104 may not form two separate sections. Rather, the semi-conductive insert 104 can comprise a single piece that includes both the soft area 122 and the stiff area 120. Such a single-piece semi-conductive insert 104 can be formed by using a mold with two openings, and injecting the soft material into one opening, and the stiff material into the other opening with the soft and stiff materials meeting at the desired location of the joint 118.

In an exemplary embodiment, manufacturing the separable insulated connector can include manufacturing the shell 102, manufacturing the semi-conductive insert 104, and then placing the semi-conductive insert 104 within the shell 102. In a particular exemplary embodiment, after placing the semi-conductive insert 104 within the shell 102, insulating material 126 can be injected into the shell 102. Such insulating material 126 then can cool and bond to the shell 102 and to the semi-conductive insert 104, thereby holding the semi-conductive insert 104 in place. As described previously, in a particular exemplary embodiment, once cooled, the insulating material 126 also can bond the stiff areas 106, 120 of the shell 102 and/or semi-conductive insert 104 to the corresponding soft areas 108, 122. In a further exemplary embodiment, the compression connector 128 then can be inserted into the semi-conductive insert 104, and connected to a plug 214 or probe 114 that can be inserted into the bushing entrance 110 of the shell 102.

In exemplary embodiments, the insulating material 126 can comprise a variety of suitable materials, such as EPDM rubber, TPR, or silicone rubber. Unlike with the EPDM rubber that can be used to form the shell 102 and the semi-conductive insert 104, the EPDM rubber forming the insulting material may not be mixed with carbon black. The absence of conductive carbon black can provide the insulating property for the EPDM rubber.

In another exemplary embodiment, the insulating material 126 also can comprise a stiff area and a soft area. In such an embodiment, the border between the stiff and soft areas of the insulating material 126 can roughly correspond with the 118 between the soft area 108 and stiff area 106 of the shell 102. Alternatively, the border between the stiff and soft areas of the insulating material 126 can be placed in a different location from the border 118 between the soft area 108 and stiff area 106 of the shell 102. In other exemplary embodiments, the stiff and soft areas of the insulating material 126 can be formed using any of the methods described previously with respect to forming the stiff areas 106, 120 and soft areas 108, 122 of the shell 102 and/or semi-conductive insert 104. For example, the two areas of the insulating material 126 can be formed separately and then attached together, or the two areas can be formed by simultaneously injecting the two materials into opposite ends of a single mold.

A person of ordinary skill in the art, having the benefit of the present disclosure, will recognize that variations of the exemplary embodiments described herein are possible. For example, FIG. 2 is a cross-sectional side view of a T-body connector 200 having stiff areas 206, 220 and a soft areas 208, 222 for its shell 202 and semi-conductive insert 204, according to an exemplary embodiment.

In exemplary embodiments, the shape of the semi-conductive insert 204 and the shell 202 of the T-body connector 200 can be different from the shapes of the corresponding components of the elbow connector 100, as shown in FIG. 1. For example, the bushing entrance 210 of the T-body connector 200 can include two openings: a first opening 212 and a second opening 213. In exemplary embodiments, the first opening 212 can be used to attach the T-body connector 200 to an insert 214, or other energy distribution component. In various exemplary embodiments, the second opening 213 can be used to connect another device to the T-body connector 200, such as a device for measuring the electric flow through the T-body connector 200 or to connect the T-body connector 200 to another energy distribution component. Alternatively, the second opening 213 of the T-body connector 200 need not be connected to another device, and a protective cap may cover the second opening 213. Additionally, as shown in FIG. 2, the semi-conductive insert 204 of the T-body connector 200 can have a substantially straight shape, instead of bending in an elbow shape, as with the semi-conductive insert 104 of the elbow connector 100.

Despite the differences in shape or configuration that can exist between the shell 102, 202 and semi-conductive insert 104, 204 of the T-body connector 200 and an elbow connector 100, an exemplary T-body connector 200 can include many of the components and configurations discussed previously with respect to the elbow connector 100. For example, the shell 202 of the T-body connector 200 can include a pulling eye 116. As described previously with respect to the elbow connector, the pulling eye 116 can function as a handle for the T-body connector 100. In an exemplary embodiment, the T-body connector 200 also can include a semi-conductive insert 204. The semi-conductive insert 204 can be disposed within the shell 202, as shown in FIG. 2. In a particular exemplary embodiment, the semi-conductive insert 204 also can include an upper section 224 that is disposed within the bushing entrance 210 of the shell 202. In such an embodiment, the upper section 224 of the semi-conductive insert 204 can include an opening configured to accept a cable, plug 214, probe 114, or another an energy distribution component inserted into the bushing entrance 210 of the shell 202.

As described previously with respect to the elbow connector 100, the semi-conductive insert 204 of the T-body connector 200 can be made of the same material used in the manufacture of the shell 202. For example, the semi-conductive insert 204 can comprise EPDM rubber with carbon black mixed in, thereby providing the semi-conductive property for the semi-conductive insert 204. Alternatively, a variety of other materials can be used to form the semi-conductive insert 204 or the shell 202, as described previously with respect to the elbow connector 100.

The T-body connector 200 also can comprise a variety of additional components and features described previously with respect to the elbow connector 100. For example, the T-body connector 200 can utilize a cable adapter. An exemplary cable adapter 216 is shown in FIG. 2, shown inserted into an exemplary T-body connector 200, which will be discussed in more detail with reference to FIG. 2. As shown in FIG. 2, an exemplary cable adapter 216 can include a semi-conductive section 236 and an insulating section 238. Both sections 236, 238 can comprise EPDM rubber, with the semi-conductive section 236 further including carbon black or other suitable semi-conductive materials.

In exemplary embodiments, each cable adapter 216 can be designed to accept a range of cable widths, each width within the range being sufficiently narrow to fit within the opening provided, and sufficiently wide to be secured within the cable adapter 216. Each T-body connector 200—or in more specific exemplary embodiments, each semi-conductive insert 204—then can be designed to accept a range of cable adapter 216 widths, thereby enabling each elbow connector to accept a large range of cable widths.

In other exemplary embodiments, the T-body connector 200 also can include a compression connector 128 that can be disposed within the semi-conductive insert 204 and can crimp a cable inserted into the T-body connector 200. Additionally, in exemplary embodiments, the T-body connector 200 can include a capacitive test point 130 molded on the shell 202 of the T-body connector 200. In an exemplary embodiment, a protective cap 132 can be placed on the capacitive test point 130 when it is not in use.

In exemplary embodiments, as shown in FIG. 2, the shell 202 of the T-body connector 200 also can include a ground wire tab 134, to which a wire can be attached and grounded. As described previously with respect to the elbow connector 100, use of the ground wire tab 134 can provide ground shield continuity for the T-body connector 200, thereby providing deadfront safety for the shell 202.

Additionally, in exemplary embodiments, the shell 202 and semi-conductive insert 204 of the T-body connector 200 can be made from a mixture comprising EPDM rubber and carbon black. The various exemplary methods and steps described previously for manufacturing the elbow connector 100 can largely be used for manufacturing a T-body connector 200.

Additionally, either the shell 202 or the semi-conductive insert 204 of the T-body connector 200—or both—can include a stiff area 206, 220 and a soft area 208, 222, respectively. In an exemplary embodiment, a soft area 208 can be located on the bushing entrance 210—or particularly on the first opening 212 and/or second opening 213 of the bushing entrance 210. Such a soft area 208 can provide increased flexibility and elasticity for the openings 212, 213 of the bushing entrance 210. This increased flexibility can allow for the easier insertion and removal of a greater variety of plugs, probes, and/or other energy distribution components into the openings of the shell 202 when compared to shells of conventional separable insulated connectors. Similarly, a soft area 222 also can be located on the upper section 224 of the semi-conductive insert 204, thereby providing additional flexibility.

Alternatively, the soft areas 208, 222 of the T-body connector 200 can be located towards the bottom of the shell 202 and/or semi-conductive insert 204. For example, the portion of the shell 202 and/or semi-conductive insert 204 in which the cable adapter 216 can be inserted can comprise the soft area 208, 222. Such a soft area 208, 222 can provide increased flexibility and elasticity, thereby allowing a greater range of cable adapter 216 widths to be inserted therein, and be used with the T-body connector 200. In such an embodiment, the stiff areas 206, 220 of the T-body connector 200 can be located above the soft areas 208, 222, such as on the bushing entrance 210. In an alternative embodiment, the T-body connector 200 may not include a stiff area 206, 220 on the shell 202 and/or semi-conductive insert 204.

In various other exemplary embodiments, the shell 102, 202 and/or semi-conductive insert 104, 204 of the elbow connector 100 or T-body connector 200 can include additional stiff or soft areas, wherever extra strength or flexibility may be desirable. For example, the bottom portion of the semi-conductive inserts 104, 204 can comprise a soft area—whether in addition to or instead of a soft area 122, 222 on the top portion of the semi-conductive insert 104, 204. Such a soft area can allow for more flexibility, thereby further increasing the variety of cable adapter 216 widths that can be used with the separable insulated connector and allowing easier installation and removal of the cable adapter 216.

Additionally, having a stiff area on the bushing entrance 110, 210—whether in addition to or instead of a stiff area 106, 206 on the bottom portion of the shell 102, 202—can provide additional advantages to the elbow or T-body connector 100, 200. For example, a stiff bushing entrance 110, 210 can create a tighter, more secure, and less flexible fit between the bushing entrance 110, 210 and the bushing inserted therein. Such a tight fit can improve the dielectric performance of the connector 100, 200 minimizing the amount of water or contaminants that could seep into the connector 100, 200. Additionally, the tighter connection also can provide for fault closure between the connector 100, 200 and the bushing or distribution component to which the connector 100, 200 has been attached, thereby improving the safety of the installation, adjustment, and operation of the connector 100, 200.

Figure 3:
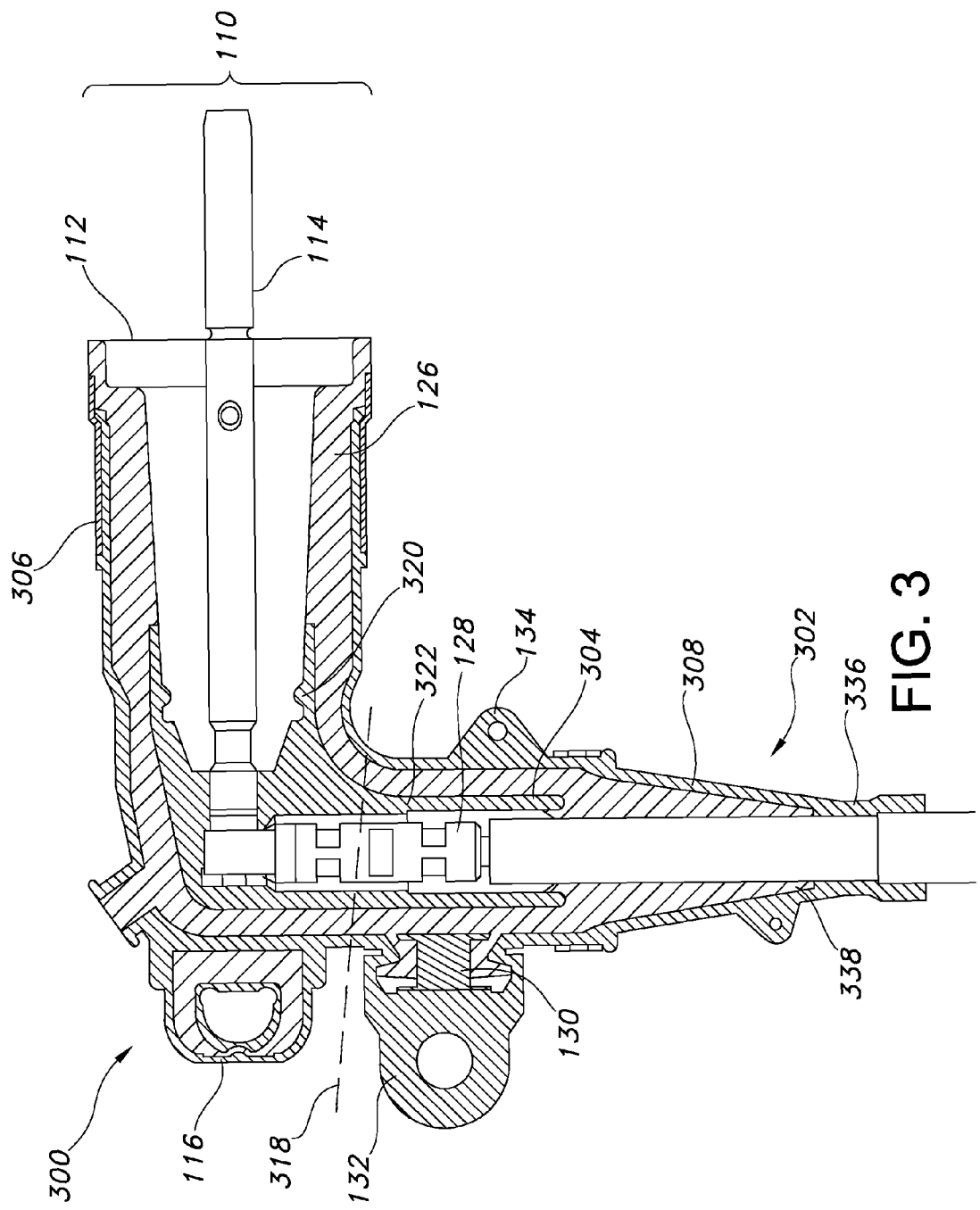
FIG. 3 is a cross-sectional side view of an elbow connector having a stiff area and a soft area, according to an alternative exemplary embodiment.

FIG. 3 is a cross-sectional side view of an elbow connector 300 having a stiff area 306 and a soft area 308, according to an alternative exemplary embodiment. The elbow connector 300 is configured similarly to the elbow connector 100 shown in FIG. 1, and includes many of the same components. The elbow connector 300 of FIG. 3 differs from the elbow connector 100 shown in FIG. 1 in that the stiff areas 306, 320 and soft areas 308, 322 of the shell 302 and semi-conductive insert 304 are positioned differently. For example, the soft areas 308, 322 of the elbow connector 300 can be located towards the bottom of the shell 302 and/or semi-conductive insert 304.

In an exemplary embodiment, the portion of the shell 302 and/or semi-conductive insert 304 in which the cable can be inserted can comprise the soft area 308, 322. Such a soft area 308, 322 can provide increased flexibility and elasticity, thereby allowing a greater range of cable widths to be inserted therein, and be used with the elbow connector 300. In such an embodiment, the stiff areas 306, 320 of the elbow connector 300 can be located above the soft areas 308, 322, as shown by the exemplary border 318. The stiff areas 306, 320 provide more strength in the area of the pulling eye 116.

In an exemplary embodiment, the elbow connector 300 can include a cable adapter (not shown) that can function similarly to the cable adapter 216 disposed in the T-body connector 200, and can include similar components. For example, such a cable adapter can include a semi-conductive section 336 and an insulating section 338. Both sections 336, 338 can comprise EPDM rubber or any other suitable type of rubber, with the semi-conductive section 336 further including carbon black or other suitable conductive materials.

Many other modifications, features, and embodiments will become evident to a person of ordinary skill in the art having the benefit of the present disclosure. It should be appreciated, therefore, that many aspects of the invention were described above by way of example only and are not intended as required or essential elements of the invention unless explicitly stated otherwise. It should also be understood that the invention is not restricted to the illustrated embodiments and that various modifications can be made within the spirit and scope of the following claims.

We claim:

1. A separable insulated connector, comprising:
   an external shell for grounding said connector, wherein said shell comprises at least one of a conductive material and a semi-conductive material, wherein said shell comprises
   a first portion comprising a first material,
   a bushing entrance for connection to an energy distribution component, the bushing entrance comprising at least a part of said first portion,
   a second portion comprising a second material that is more flexible than said first material, and
   a cable entrance for receiving a cable, the cable entrance comprising at least a part of said second portion;
   an insert disposed within said external shell, wherein said insert comprises at least one of a conductive material and a semi-conductive material, wherein said insert is a faraday cage; and
   insulating material directly disposed between said external shell and said insert such that an interior surface of the external shell covers substantially an entire outer surface of the insulating material, wherein said insulating material is non-conductive, wherein said insulating material prevents a voltage breakdown between said shell and said insert.

2. The separable insulated connector of claim 1, wherein said first material comprises a mixture comprising ethylene propylene dienemonomer rubber and carbon black, and
   wherein said second material comprises a mixture comprising ethylene propylene dienemonomer rubber and carbon black.

3. The separable insulated connector of claim 1, wherein said separable insulated connector comprises an elbow connector.

4. The shell of claim 1, wherein said separable insulated connector comprises a T-body connector.

5. The separable insulated connector of claim 1, wherein said first portion abuts said second portion.

6. The separable insulated connector of claim 1, wherein said first portion overlaps with said second portion.

7. The separable insulated connector of claim 1, wherein said first material has a tensile stress measurement from about 1% to about 15% higher than a tensile stress measurement of said second material.

8. The separable insulated connector of claim 1, wherein said first material has an elongation measurement from about 1% to about 40% lower than an elongation measurement of said second material.

9. The separable insulated connector of claim 1, wherein said first material has a durometer measurement from about 5% to about 25% higher than a durometer measurement of said second material.

10. The separable insulated connector of claim 1, wherein said first material has a modulus measurement from about 10% to about 60% higher than a modulus measurement of said second material at a 50%, 75%, and 100% elongation percentage.

11. A separable insulated connector, comprising:
an external shell for grounding said connector, wherein said shell comprises at least one of a conductive material and a semi-conductive material;
a single insert disposed within said external shell, wherein said insert comprises
a first portion comprising a first semi-conductive material, and
a second portion comprising a second semi-conductive material that is more flexible than said first material, wherein said insert is a faraday cage; and
insulating material directly disposed between said external shell and said insert, wherein said insulating material is non-conductive, wherein said insulating material prevents a voltage breakdown between said shell and said insert.

12. The separable insulated connector of claim 11, wherein said first material comprises a mixture comprising ethylene propylene dienemonomer rubber and carbon black,
wherein said second material comprises a mixture comprising ethylene propylene dienemonomer rubber and carbon black, and
wherein said semi-conductive insert comprises a conductive or semi-conductive material.

13. The separable insulated connector of claim 11, wherein said semi-conductive insert is configured to be inserted within a shell for said separable insulated connector.

14. The separable insulated connector of claim 11, wherein said separable insulated connector comprises an elbow connector.

15. The semi-conductive insert of claim 11, wherein said separable insulated connector comprises a T-body connector.

16. The separable insulated connector of claim 11, wherein said semi-conductive insert comprises a faraday cage.

17. A separable insulated connector, comprising:
an external shell for grounding said connector, wherein said shell comprises at least one of a conductive material and a semi-conductive material;
a semi-conductive insert disposed within said external shell, wherein said semi-conductive insert is a faraday cage; and
insulating material directly disposed between said external shell and said semi-conductive insert such that an interior surface of the external shell covers substantially an entire outer surface of the insulating material, wherein said insulating material is non-conductive, wherein said insulating material prevents a voltage breakdown between said shell and said insert,
wherein at least one of said external shell, said semi-conductive insert, and said insulating material comprises a first portion, a bushing entrance for connection to an energy distribution component, the bushing entrance comprising at least a part of said first portion, a second portion, and a cable entrance for receiving a cable, the cable entrance comprising at least a part of said second portion,
wherein said first portion comprises a first material, and
wherein said second portion comprises a second material that is more flexible than said first material.

18. The separable insulated connector of claim 17, wherein said insulating material comprises ethylene propylene dienemonomer rubber.

19. The separable insulated connector of claim 17, wherein said insulating material is bonded to said shell and said insert.

20. The separable insulated connector of claim 17, wherein said first material comprises a mixture comprising ethylene propylene dienemonomer rubber and carbon black,
wherein said second material comprises a mixture comprising ethylene propylene dienemonomer rubber and carbon black, and
wherein said insert comprises a semi-conductive material.

21. The separable insulated connector of claim 17, wherein said separable insulated connector comprises an elbow connector.

22. The separable insulated connector of claim 17, wherein said separable insulated connector comprises a T-body connector.

23. The separable insulated connector of claim 17, further comprising:
a cable adapter; and
a probe;
wherein said cable adapter is located in said second portion, and
wherein said probe is located in said first portion.

* * * * *